(12) United States Patent
Rubarkh et al.

(10) Patent No.: US 12,368,631 B2
(45) Date of Patent: Jul. 22, 2025

(54) NETWORK ELEMENT DYNAMIC ALARM SMOOTHING INTERVAL

(71) Applicant: AT&T Intellectual Property I, L.P., Atlanta, GA (US)

(72) Inventors: Alexander Rubarkh, Richboro, PA (US); Vinit Kumar, Jackson, NJ (US); Rami Kurdi, Fuquay Varina, NC (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/472,179

(22) Filed: Sep. 21, 2023

(65) Prior Publication Data
US 2025/0106092 A1    Mar. 27, 2025

(51) Int. Cl.
*H04L 41/0604*    (2022.01)
*H04L 41/16*    (2022.01)

(52) U.S. Cl.
CPC ...... *H04L 41/0627* (2013.01); *H04L 41/0618* (2013.01); *H04L 41/0622* (2013.01); *H04L 41/16* (2013.01)

(58) Field of Classification Search
CPC ............ H04L 41/0627; H04L 41/0618; H04L 41/0622; H04L 41/16
See application file for complete search history.

(56) References Cited

U.S. PATENT DOCUMENTS

| | | | | |
|---|---|---|---|---|
| 8,612,612 | B1 * | 12/2013 | Dukes | H04L 67/141 709/203 |
| 2008/0263388 | A1 * | 10/2008 | Allen | H04L 41/0631 714/4.1 |
| 2023/0032163 | A1 * | 2/2023 | Shaswat | G06N 20/20 |
| 2023/0403259 | A1 * | 12/2023 | Baraz | H04L 9/0891 |
| 2023/0420102 | A1 * | 12/2023 | Walters | G16H 20/30 |

* cited by examiner

*Primary Examiner* — Andrew C Georgandellis

(57) ABSTRACT

A processing system including at least one processor may detect an outage associated with at least one network element, apply at least one attribute of the at least one network element as at least a first input of a plurality of inputs to a machine learning model that is implemented by the processing system to obtain an output of the machine learning model indicative of an alarm smoothing interval, and present, in accordance with the alarm smoothing interval, an alarm indicative of the outage associated with the at least one network element.

20 Claims, 4 Drawing Sheets

NETWORK ELEMENT DYNAMIC ALARM SMOOTHING INTERVAL

The present disclosure relates generally to network monitoring and troubleshooting, and more specifically to methods, computer-readable media, and apparatuses for presenting an alarm indicative of an outage associated with at least one network element in accordance with an alarm smoothing interval based on a machine learning model output indicative of the alarm smoothing interval.

BACKGROUND

Network monitoring systems receive, store, and process, large volumes of network related notifications. At least some of these notifications identify network element outages that may call for troubleshooting/resolution. However, in many cases, outages resolve on their own and/or without intervention after a short period of time. For instance, an outage may be caused by an upstream device that prevents communication from a monitoring system to a particular network element. However, the upstream device may simply be undergoing a reset and may be fully operational again within minutes. Alarm smoothing intervals are used to prevent premature commitment of resources to address problems that may not need intervention. In particular, an alarm smoothing interval is a time delay between receiving of an alert, or otherwise detecting an issue with a network element (e.g., an outage) and the generating and/or issuance of a trouble ticket (broadly a "notification") to network personnel or another automated system to troubleshoot the outage.

SUMMARY

In one example, the present disclosure describes a method, computer-readable medium, and apparatus for presenting an alarm indicative of an outage associated with at least one network element in accordance with an alarm smoothing interval based on a machine learning model output indicative of the alarm smoothing interval. For instance, in one example, a processing system including at least one processor may detect an outage associated with at least one network element, apply at least one attribute of the at least one network element as at least a first input of a plurality of inputs to a machine learning model that is implemented by the processing system to obtain an output of the machine learning model indicative of an alarm smoothing interval, and present, in accordance with the alarm smoothing interval, an alarm indicative of the outage associated with the at least one network element.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
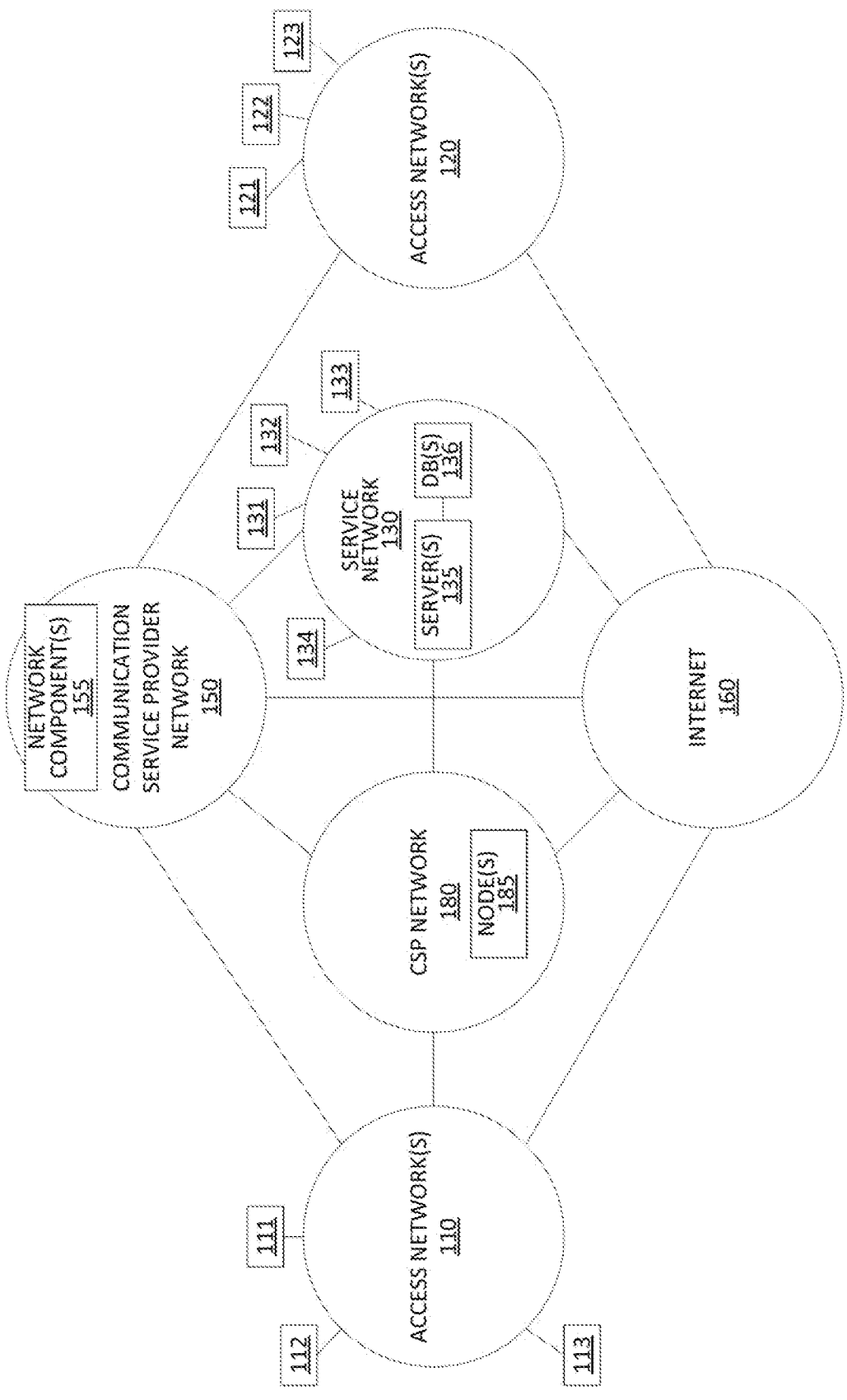
FIG. 1 illustrates one example of a system related to the present disclosure.

The present disclosure broadly discloses methods, non-transitory (i.e., tangible or physical) computer-readable storage media, and apparatuses for presenting an alarm indicative of an outage associated with at least one network element in accordance with an alarm smoothing interval based on a machine learning model output indicative of the alarm smoothing interval. Network monitoring systems receive, store, and process, large volumes of network related notifications. In a large communication network, a single network monitoring server instance, also known as a "poller", may process in excess of 200 million such notifications per month. A network monitoring system may be scaled to support thousands of distributed devices, or assets, such as routers, switches, firewalls, software defined network (SDN) components, e.g., hundreds of network monitoring servers processing tens of billions of alarms/notifications monthly. Alarm smoothing reduces the number of trouble tickets needing resolution. In particular, an alarm smoothing interval is a time delay between receiving of an alarm/alert, or otherwise detecting an issue with a network element (e.g., an outage) and the generating and/or issuance of a trouble ticket (broadly a "notification") to network personnel or another automated system to troubleshoot the alarm. In other examples, a fixed smoothing delay may be applied with respect to alarms/alerts for all monitored network elements of the network monitoring system. The smoothing interval may be manually adjusted, e.g., at the discretion of responsible network personnel. For instance, network personnel may decide to change the alarm smoothing interval in response to varying frequencies of tickets and/or changing alarm rates, thereby resulting in over-monitoring and under-monitoring of network elements. In one example, a network monitoring system, or server, may be operated by a first entity for monitor network elements associated with one or more other entities. For instance, a communication network operator may provide a network monitoring system that monitors network-based servers associated with other entities (e.g., web servers, streaming media servers, content distribution networks, database systems, etc.). Alternatively, or in addition, a cloud computing service provider may provide a network monitoring system that similarly monitors network-based devices associated with other entities, e.g., virtual machines (VMs) hosted on shared hardware infrastructure of the cloud computing service provider.

In accordance with the present disclosure, a dynamic alarm smoothing interval may be computed and applied to each managed device or system based on factors such as alarm pattern and volume, device type, transport type, deployment architecture (e.g., in the cloud or on-premises), failure impact on downstream devices, impact to services such as voice, video, and data, and so forth. For instance, network devices with less service impact and devices with chronic failures may be assigned longer aging or smoothing intervals as compared to network devices with greater service impact and/or less frequent failures. In one example, feature engineering may be applied to obtain an analytics-ready data set, which may include a network outage data set joined with other relevant data sets to add valuable features to the analysis. In one example, data transformations may be used to create new data attributes, or "features", which may include time features such as: year, quarter, month, domestic and international holiday, weekend and weekday, outside and inside business hours, or the like. New data attributes/ features may also include geographic features (e.g., a state, county, or other geographic bounds in which the asset is located, whether a physical location of a network element is urban, suburban, rural, etc., whether the physical location is at ground level, below ground, several stories above ground, etc., whether the physical location is on a rooftop, a tower, or the like, and so forth).

In one example, a machine learning model (MLM) configured for time-series predictive analysis may be used to identify a relationship between the outage time and various features, such as mentioned above and/or as described in greater detail below. For instance, the MLM may comprise a random forest model, a convolutional neural network (CNN), such as an AlexNet model, a WaveNet model, or the like, a recurrent neural network (RNN), a long short-term memory (LSTM) model, and so forth. Through machine learning algorithm (MLA)/MLM training, the network monitoring system may learn feature importance (e.g., rankings) and may obtain predictive values of smoothing intervals for real-time use. In one example, the present disclosure may further apply natural language processing (NLP), sentiment analysis, and/or similar techniques for additional rule-based adjustment of smoothing intervals. For instance, theme/topic identification and sentiment analysis of selected news websites, feeds, or the like may identify scheduled events (e.g., major sporting events, presidential election, national holiday, etc.) or spontaneous events (e.g., breaking news, weather storm, cyber-attack, etc.). Accordingly, the network monitoring system may then apply modification(s) to smoothing intervals for one or more network element(s) according to one or more rules. In one example, the network monitoring system may further correlate the physical location of a network element (e.g., geographic coordinates, such as defined by latitude, longitude, and or elevation of the asset) with such event(s) for modification of a smoothing interval according to one or more rules. For example, in the case of a weather event, the smoothing interval may be increased in proportion to a distance of the network element from a location of the weather event (e.g., a center of the weather event as may be determined via NLP/sentiment analysis in the prior step) according to a defined rule. In another example, the weather event may have a defined bounds. For instance, a weather data feed may specify states, counties, or the like, may define bounds of a weather alert area according to coordinates of polygon vertices, or the like, and so forth. As such, when the location of the network element is determined to be within the weather alert area, the smoothing interval may be increased by a defined duration of time and/or as a percentage of the smoothing interval as previously determined via the MLM as described above.

Thus, in one example, the present disclosure may provide a multi-tier approach in which various features associated with a network element may be used to obtain a customized alarm smoothing interval. First, one or more features may be applied as inputs to a machine learning model to obtain a recommended alarm smoothing interval. Next, in one example, the present disclosure may apply one or more defined rules to upgrade or downgrade the recommended alarm smoothing interval, such as based on the business impact of the asset, technology complexity of the asset, and/or the support model of the asset. Alternatively, or in addition, the present disclosure may apply one or more rules to upgrade or downgrade the recommended alarm smoothing interval based upon the detection of one or more events (e.g., a weather event, a major sporting event, etc.). Accordingly, examples of the present disclosure enable network failures that result in high service impact to be addressed quickly by network personnel, resulting in reduced mean-time-to-restore (MTTR) and enhanced compliance with or exceeding of service level agreements (SLAs). In addition, examples of the present disclosure reduce the number of unwanted, redundant, and/or excessive alarms and tickets in work centers' queues, resulting in resources being directed to more important outages. Thus, examples of the present disclosure may be employed in communication network operation and automation (e.g., artificial intelligence for information technology (IT) operations (AIOps)). Examples of the present disclosure may alternatively or additional include monitoring, alerting, and/or reconfiguring of a communication network in response to one or more alarms (e.g., trouble tickets) relating to one or more monitored network elements. These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure for may operate. Communication service provider network 150 may comprise a core network with components for telephone services, Internet services, and/or video services (e.g., triple-play services, etc.) that are provided to customers (broadly "subscribers"), and to peer networks. In one example, communication service provider network 150 may combine core network components of a cellular network with components of a triple-play service network. For example, communication service provider network 150 may functionally comprise a fixed-mobile convergence (FMC) network, e.g., an IP Multimedia Subsystem (IMS) network. In addition, communication service provider network 150 may functionally comprise a telephony network, e.g., an Internet Protocol/Multi-Protocol Label Switching (IP/ MPLS) backbone network utilizing Session Initiation Protocol (SIP) for circuit-switched and Voice over Internet Protocol (VOIP) telephony services. Communication service provider network 150 may also further comprise a broadcast television network, e.g., a traditional cable provider network or an Internet Protocol Television (IPTV) network, as well as an Internet Service Provider (ISP) network. With respect to video service provider functions, communication service provider network 150 may include one or more video servers (e.g., television servers) for the delivery of video content, e.g., a broadcast server, a cable head-end, a video-on-demand (VOD) server, and so forth. For example, communication service provider network 150 may comprise a video super hub office, a video hub office and/or a service office/central office.

In one example, communication service provider network 150 may also include one or more network components 155. In one example, the network component(s) 155 may each comprise a computing system, such as computing system 400 depicted in FIG. 4, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the communication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other centralized system components may include, for example, a layer 3 router, a short message service (SMS) server, a voicemail server, a video-on-demand server, a server for network traffic analysis, a database server/database system, and so forth. It should be noted that in one example, a centralized system component may be hosted on a single server, while in another example, a centralized system component may be hosted on multiple servers, e.g., in a distributed manner. For ease of illustration, various components of communication service provider network 150 are omitted from FIG. 1.

In one example, various components of communication service provider network 150 comprise network function virtualization infrastructure (NFVI), e.g., software defined network (SDN) host devices (i.e., physical devices) configured to operate as various virtual network functions (VNFs), such as a Short Message Service (SMS) server, a voicemail server, a video-on-demand server, etc. For instance, network component(s) 155 may represent any one or more NFVI/SDN host devices configured to operate as any one or more of such VNFs. Similarly, in an example in which communication service provider network 150 may comprise a cellular core network, network component(s) 155 may represent NFVI hosting one or more of a virtual MME (vMME), a virtual HHS (vHSS), a virtual serving gateway (vSGW), a virtual packet data network gateway (vPGW), and so forth. Thus, for example, network component(s) 155 may comprise a vMME, a vSGW, a virtual access management function (AMF), a virtual network slice selection function (NSSF), a virtual user plane function (UPF), and so forth, In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between devices 111-113, devices 121-123, and service network 130, and between communication service provider network 150 and devices 111-113 and 121-123 relating to voice telephone calls, communications with web servers via the Internet 160, and so forth. Access networks 110 and 120 may also transmit and receive communications between devices 111-113, 121-123 and other networks and devices via Internet 160. For example, one or both of the access networks 110 and 120 may comprise an ISP network, such that devices 111-113 and/or 121-123 may communicate over the Internet 160, without involvement of the communication service provider network 150. Devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of devices 111-113 and 121-123 may represent one or more user devices and/or one or more servers of one or more other entities, such as a weather data service, a traffic management service (such as a state or local transportation authority or the like), a news website, etc. Similarly, any one or more of devices 111-113 and 121-123 may represent one or more network elements to be monitored by a network monitoring system as described herein.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the communication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where communication service provider network 150 may provide core network functions, e.g., of a public land mobile network (PLMN)-universal mobile telecommunications system (UMTS)/General Packet Radio Service (GPRS) core network, or the like. In such an example, access networks 110 and 120 may include one or more cell sites, which may include antenna arrays (e.g., remote radio heads (RRHs), base station equipment and/or one or more components thereof (e.g., a distributed unit (DU) and/or centralized unit (CU), etc.), transformers, battery units, and/or or other power equipment, and so forth. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the devices 111-113 and 121-123, respectively.

In this regard, it should be noted that in some examples, devices 111-113 and 121-123 may connect to access networks 110 and 120 via one or more intermediate devices, such as a gateway and router, e.g., where access networks 110 and 120 comprise cellular access networks, ISPs and the like, while in another example, devices 111-113 and 121-123 may connect directly to access networks 110 and 120, e.g., where access networks 110 and 120 may comprise local area networks (LANs), enterprise networks, and/or home networks, and the like.

In one example, system 100 may also include a cloud service provider (CSP) network 180 having one or more host devices, or nodes 185, which may each comprise networked computing resources for providing cloud services directly on behalf of CSP network 180 and/or for third parties having project development environments, data storage, and/or applications/services hosted via CSP network 180. For instance, node(s) 185 may comprise public or private cloud computing resources in one or more data centers, such as central processing units (CPUs), graphics processing units (GPUs), memory, storage devices, and so forth. The computing resources may operate as servers for hosting virtual machines, containers, microservices, or the like providing various applications, may operate as storage systems for storing databases, data tables, graphs, and so on. In one example, CSP network 180 may comprise a content distribution network (CDN) or at least a portion thereof. In various examples, CSP network 180 may be provided by a same entity as communication service provider network 150 or a different entity. It should also be noted that in one example, access networks 110 and/or 120 may comprise "edge clouds" which may similarly include host devices/nodes for providing cloud services such as mentioned above, but in locations that may be physically closer to various endpoint devices that may utilize such services.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the communication service provider network 150. For example, the service network 130 may comprise one or more devices for providing services to subscribers, customers, and/or users. For example, communication service provider network 150 may provide a cloud storage or other cloud computing service, web server hosting, and other services. As such, service network 130 may represent aspects of communication service provider network 150 where infrastructure for supporting such services may be deployed. In another example, service network 130 may provide network management (e.g., including outage monitoring, troubleshooting, remediation, etc.) as a service to various other entities. For instance, in a managed information technology (IT) scenario, a provider and consumer enter into an agreement for proactive monitoring and support for managed assets (broadly, network elements).

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the communication service provider network 150, devices 131-134 of the service network 130 may comprise devices of network personnel, such as network operations personnel and/or personnel for network maintenance, network repair, construction planning, and so forth. Similarly, personnel using devices 131-134 may also be engaged in providing network management (e.g., including outage monitoring, troubleshooting, remediation, etc.) as a service to various other entities. Thus, for example, alarms/trouble tickets relating to network element outages may be provided to devices 131-134 using alarm smoothing intervals via a ML-based selection process as described herein.

In the example of FIG. 1, service network 130 may include one or more servers 135 which may each comprise all or a portion of a computing device or system, such as computing system 400, and/or processing system 402 as described in connection with FIG. 4 below, specifically configured to perform various steps, functions, and/or operations for presenting an alarm indicative of an outage associated with at least one network element in accordance with an alarm smoothing interval based on a machine learning model output indicative of the alarm smoothing interval, as described herein. For example, one of the server(s) 135, or a plurality of servers 135 collectively, may perform operations in connection with the example process 200 of FIG. 2, the example method 300 of FIG. 3, or as otherwise described herein. In one example, the one or more of the servers 135 may represent a platform comprising a network monitoring system, a trouble ticket system, and so forth (e.g., a network-based and/or cloud-based service hosted on the hardware of servers 135).

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for presenting an alarm indicative of an outage associated with at least one network element in accordance with an alarm smoothing interval based on a machine learning model output indicative of the alarm smoothing interval, as described herein. As just one example, DB(s) 136 may be configured to receive, create, and/or store outage records relating to various network elements. For instance, outage records may include a timestamp of the outage associated with a network element (e.g., when the outage is detected via non-acknowledgement of polling/heartbeat message(s), via a notification from one or more other network elements, via a notification from the network element itself (such as for an automated shutdown in response to one or more self-detected conditions), and so forth) and an identification of the affected network element. Outage records may also include a time of issuance of a trouble ticket/alert (and/or a smoothing interval between the outage detection and the issuance of the trouble ticket/alert), a time to resolve the outage, a technician arrival time (and/or a time to respond) and a departure time, and so forth. In accordance with the present disclosure an outage record may in some cases include a label, e.g., feedback, associated with a smoothing interval applied with respect to alerting of the outage.

In accordance with the present disclosure, DB(s) 136 may further store network inventory records, e.g., comprising geographic features, such as a network element location (e.g., coordinates, building location, floor location within building, etc.), a site type, a location class (e.g., urban, suburban, rural, etc.), etc., and asset attributes/features, such as: a network element type (e.g., an asset class), a version, etc., a memory capacity, processor specifications, ports used, line card specifications, connected devices (e.g., a serving router, gateway, firewall, etc.), an operating system type, a manufacturer, available accessories, and so forth. In one example, a network inventory record may alternatively or additionally include a deployment date, a last serviced date, a frequency of service score, an asset priority of the network element (e.g., low, normal, high, critical, or unknown, or the like), an impact score of the network element (e.g., minimal, minor, medium, major, critical, or unknown, or the like), a service level class of the network element (e.g., according to an SLA or the like), a security zone of the network element, and so forth.

In one example, DB(s) 136 may be further configured to receive and store network operational data collected from the communication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to DB(s) 136 directly or via one or more of the servers 135. The network operational data stored in DB(s) 136 may include various data sets, such as: database throughput of one or more database instances (such as one or more of network component(s) 155 of communication service provider network 150), peak or average central processing unit (CPU) usage, memory usage, line card usage, or the like per unit time, peak or average device temperature, etc. with respect to network-based devices (e.g., one or more of network component(s) 155), radio access network (RAN) metrics, such as peak or average number of radio access bearers, average or peak upload or download data volumes per bearer and/or per connected user equipment (UE)/endpoint device, etc., such as from one or more of access networks 110 or 120, metrics that may be used for intrusion detection/alerting, such as peak or average number of connection requests to a server, link utilization metrics (e.g., peak or average bandwidth utilization in terms of total volume or percentage of maximum link capacity), etc.

Similarly, DB(s) 136 may receive and store weather data, news data, or the like from a device of a third-party, e.g., a weather service, a news service, or public announcement service, etc. via one of access networks 110 or 120. For instance, one of devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. Similarly, one of devices 111-113 or 121-123 may represent a server of a public announcement service, a news service, or the like and may forward a Really Simple Syndication (RSS) news feed, or the like to DB(s) 136, such as event announcements (e.g., major sporting events, concerts, festivals, etc., state of emergency announcements, local school vacation week reminders, and so forth). Alternatively, or in addition, server(s) 135 may crawl one or more news websites, may identify relevant events via natural language processing (NLP), sentiment analysis, and/or similar techniques, and may store event data in DB(s) 136. In addition, it should be noted that in one example, server(s) 135 may obtain and process weather data, news data, and/or the like on an ongoing basis for real-time ML-based alarm smoothing interval selection, as described herein.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. In this regard, server(s) 135 and/or DB(s) 136 may maintain communications with one or more of the devices 111-113 and/or devices 121-123 via access networks 110 and 120, communication service provider network 150, Internet 160, and so forth, e.g., in order to collect network operational data (and in one example, news, weather, traffic, and/or other data of a same or similar nature), to detect outages (e.g., via outage alerts and/or via polling, heartbeat messages, or the like), to further perform remote troubleshooting on such devices (e.g., using network operational data and/or via additional communication with monitored devices, etc.), and so on. Similarly, server(s) 135 and/or DB(s) 136 may maintain communications with one or more devices in communication service provider network 150 (e.g., server(s) 155, etc.), CSP network 180, and/or in access network(s) 110 and/or 120 in order to collect network operational data, to detect outages (e.g., via outage alerts and/or via polling, heartbeat messages, or the like), to further perform remote troubleshooting on such devices, and so on.

As noted above, server(s) 135 may be configured to perform various steps, functions, and/or operations for presenting an alarm indicative of an outage associated with at least one network element in accordance with an alarm smoothing interval based on a machine learning model output indicative of the alarm smoothing interval, as described herein. For instance, an example method for presenting an alarm indicative of an outage associated with at least one network element in accordance with an alarm smoothing interval based on a machine learning model output indicative of the alarm smoothing interval is illustrated in FIG. 3 and described in greater detail below. Similarly, server(s) 135 may perform various additional operations as described in connection with FIG. 2, or elsewhere herein.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in communication service provider network 150, and so forth. Thus, these and other modifications are all contemplated within the scope of the present disclosure.

Figure 2:
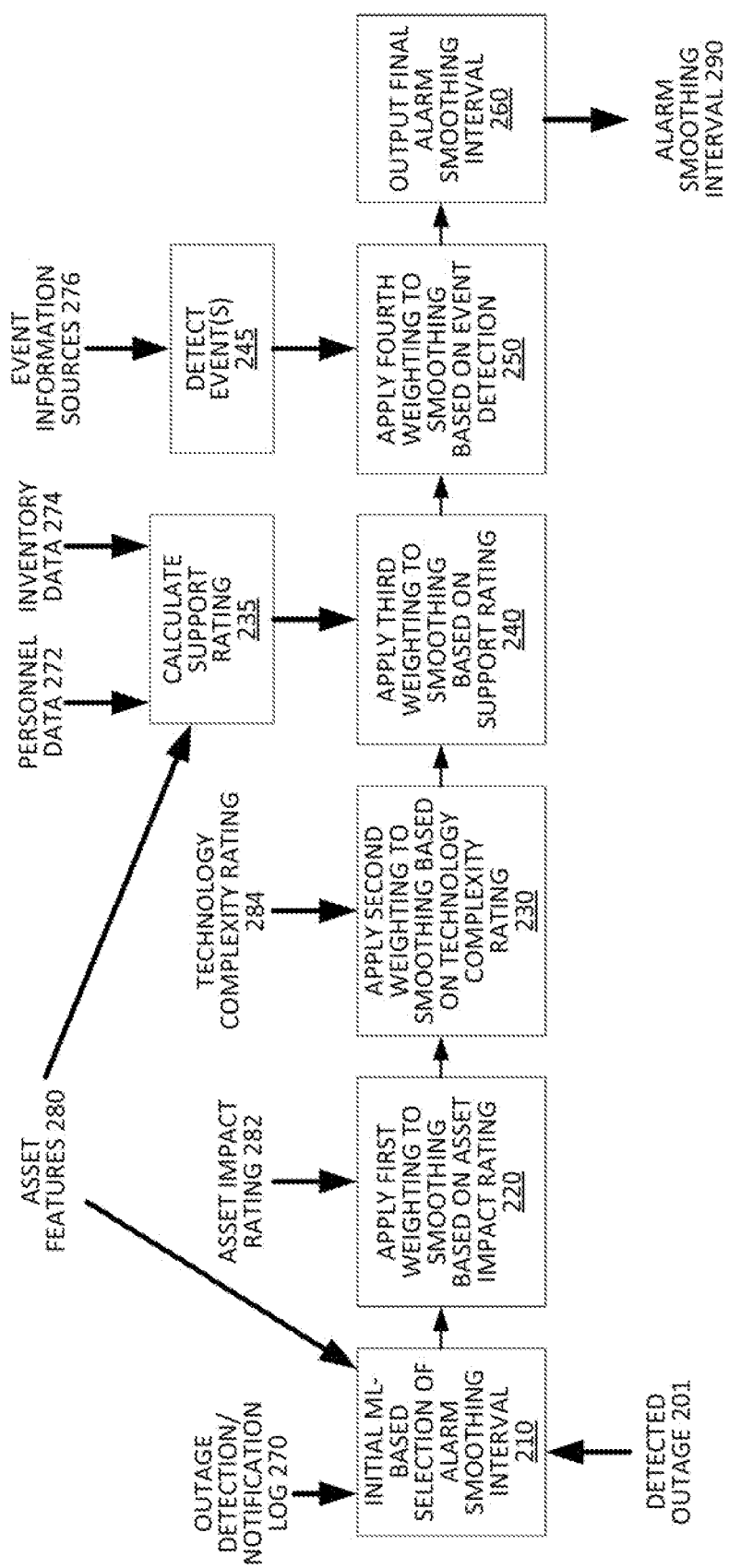
FIG. 2 illustrates an example process for selecting and applying an alarm smoothing interval in connection with an outage detected for a network element, in accordance with the present disclosure.
Figure 3:
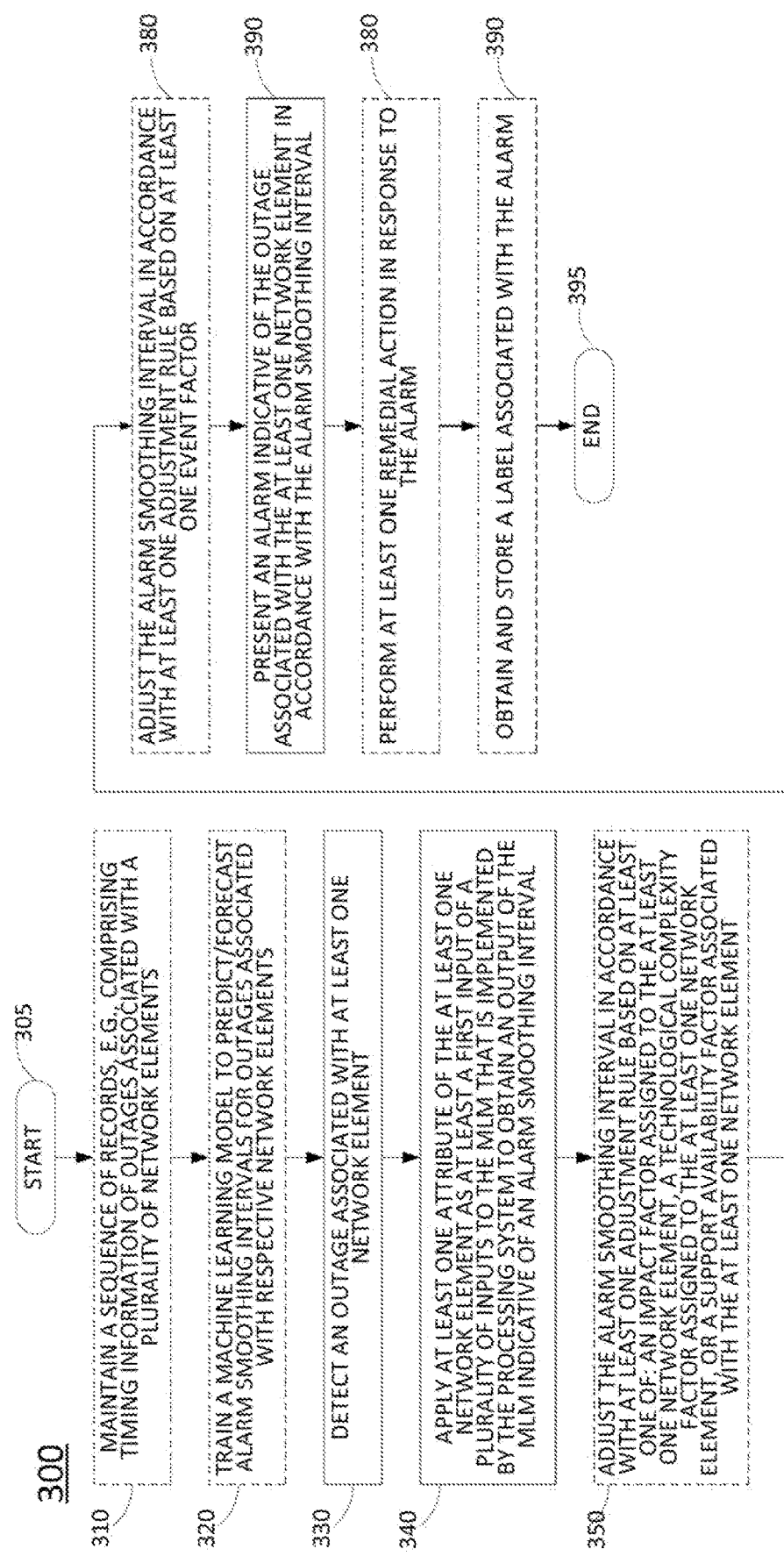
FIG. 3 illustrates an example flowchart of a method for presenting an alarm indicative of an outage associated with at least one network element in accordance with an alarm smoothing interval based on a machine learning model output indicative of the alarm smoothing interval.

FIG. 2 illustrates an example process 200 for selecting and applying an alarm smoothing interval in connection with an outage detected for a network element, in accordance with the present disclosure. In one example, the process 200 may be performed by a processing system, such as server(s) 135 in FIG. 1 and/or any one or more components thereof, or the like. As illustrated in FIG. 2, in a first stage 210, the processing system may obtain an initial, machine learning (ML)-based selection of an alarm smoothing interval for a detected outage 201 associated with a first network element. In accordance with the present disclosure, the detected outage 201 may trigger the commencement of stage 210. At stage 210, the processing system may apply (1) an outage detection/notification log 270 and (2) asset features 280 of the affected network element as inputs to a machine learning model (MLM) to obtain an initial alarm smoothing interval as an output of the MLM.

It should be noted that as referred to herein, a machine learning model (MLM) (or machine learning-based model), may comprise a machine learning algorithm (MLA) that has been "trained" or configured in accordance with input data (e.g., training data) to perform a particular service, e.g., to determine an alarm smoothing interval, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, an MLM of the present disclosure may be in accordance with a MLA/MLM template from an open source library, such as OpenCV, which may be further enhanced with domain specific training data.

In one example, the MLM of stage 210 may comprise a random forest model. In one example, the MLM may comprise a multivariate time series forecasting model. For instance, the MLM may comprise a convolutional neural network (CNN), an AlexNet model, a WaveNet model, or the like. In another example, the MLM may comprise a recurrent neural network (RNN) model, a long short-term memory (LSTM) model, or the like. In one example, the MLM may be trained with a training data set comprising verified alarm smoothing intervals for outages associated with respective network elements of a plurality of network elements. For example, the training data may comprise a data log of historical outages (e.g., at least a portion of outage detection/notification log 270 or a separate data log) and corresponding verified alarm smoothing intervals for at least a portion of the historical outages (e.g., a time series, or respective time series that may be correlated in a data preparation/pre-processing phase), as well as asset features 280 pertaining to an associated network element for each outage. The verified alarm smoothing intervals may be alarm smoothing intervals that a responsible entity may confirm are correct/desirable. For instance, network personnel may look to see an actual alarm smoothing interval that was applied in connection with an outage. If the actual alarm smoothing interval is deemed to be correct/desirable, it may be labeled as such and thus "verified". On the other hand, if the actual alarm smoothing interval is deemed to be incorrect/undesirable, a preferred alarm smoothing interval that should have been applied may be specified by the network personnel to replace the actual alarm smoothing interval. The preferred alarm smoothing interval is then considered a "verified" alarm smoothing interval for MLM training. Alternatively, or in addition, in connection with each trouble ticket that may be processed by network personnel, a user may be prompted to select one of "too fast", "just right", or "too late" in connection with the alarm smoothing interval (e.g., the timing of the delay between outage detection and issuance of the alarm/trouble ticket). For those that are just right, these may be considered positive examples for MLM training. For those that are too long or too short, these may be considered negative examples for MLM training. In one example, the data log of historical outages (e.g., at least a portion of outage detection/notification log 270 or a separate data log) may further include an indicator of a duration of time to resolve a trouble ticket/respond to an alarm. For instance, this may be a useful predictor for the MLM identify when it may be preferred to lengthen an alarm smoothing interval. For instance, the verified alarm smoothing intervals may indicate that network personnel prefer to obtain alarms/trouble tickets with increased delay when there are a large number of already outstanding trouble tickets that are not yet resolved when a new outage is detected. Likewise, this data may also be indicative of outages of that tend to resolve themselves after a passage of time.

The asset features 280 may include geographic features and asset properties/attributes, such as described above (e.g., geographic features of: a state, county, or other geographic bounds in which the asset is located, whether a physical location of a network element is urban, suburban, rural, etc., whether the physical location is at ground level, below ground, several stories above ground, etc., whether the physical location is on a rooftop, a tower, or the like, and so forth; asset attributes, such as: a network element type/asset class), version, memory capacity, processor specifications, ports used, line card specifications, connected devices, operating system type, manufacturer, available accessories, deployment date, last serviced date, frequency of service score a security zone of the network element, and so forth).

At least some of the training data may be used as testing data. For instance, the trained MLM may then be applied to testing data (e.g., associated with one or more historical outage instances) to output respective alarm smoothing intervals, which may be compared to the verified alarm smoothing intervals for such historical outages to obtain an accuracy of the MLM. In one example, the MLM may continue to be trained with additional training data, and tested with additional testing data until a threshold accuracy is achieved. In one example, the MLM may be trained with a loss function that applies to the verified alarm smoothing intervals and that excludes non-verified alarm smoothing intervals. For instance, network personnel may not be able to label all historical outages instances for labeling. Thus, not all of the historical outages may have verified alarm smoothing intervals. In one example, a loss function of the MLM may be specified to only apply to labeled data points. Thus, if a label is provided, it can then be processed via the loss function. In another example, it may be assumed that a forecast/prediction is acceptable if no corrective feedback is received. In one example, specifically labeled examples may be more heavily weighted via the loss function than examples where label is assumed (note that in all of the assumed samples, the label may be positive). It should be noted that in one example, most specific labels will be negative. However, in one example, it is possible for personnel to also specifically label examples where forecasting and the implemented alarm smoothing interval is deemed good/correct).

The trained MLM may then be placed into operation via the processing system, where new input data may be applied in connection with a detected outage (e.g., detected outage 201) to obtain an initial recommended alarm smoothing interval as an output of the MLM. For instance, upon notification or otherwise detecting the detected outage 201 (such as by a NACK, failure to receive a response to a heartbeat message, or the like), the processing system may identify the network element associated with the detected outage 201, and may obtain and apply the asset features 280 relating to the network element as an input feature vector the MLM. For instance, the asset features 280 may comprise at least a first portion of an input feature vector. At least a second portion of the input feature vector may comprise at least a portion of the outage detection/notification log 270. For instance, a lookback time period may be specified by a system operator, such as 6 hours, 12 hours, 24 hours, 36 hours, etc. For example, the MLM may be trained to consider the volume of outages and/or alarms within the time period, the frequency of detection of outages, and so forth (and may be trained in accordance with such a defined lookback period). In any case, the result of phase 210 is an initial recommended alarm smoothing interval. It should also be noted that in one example, stage 210 may be preceded by obtaining outage notification logs and joining with asset inventory to perform feature engineering, obtaining geographical attributes, deriving date/time categories corresponding to inside and outside of business hours, holidays, weekend days, etc., performing exploratory data analysis and predictions based on ML, and so forth.

At stage 220, the processing system may next obtain an asset impact rating 282 associated with the affected network element, and may apply a first weighting to the recommended alarm smoothing interval based on the asset impact rating 282. For instance, the asset impact rating 282 may be assigned by a system operator, by a device owner (which in one example may be different from the system operator), or via an automated calculation based upon a number of connected devices (e.g., based upon network topology information that may be obtained from a network data repository (e.g., a network graph database, or the like)). In one example, stage 220 may be preceded by an assessment of the business impact of the asset based on a rating scape and adding the impact score to asset attributes in inventory. In one example, the first weighting may be determined via a rule or set of rules for asset impact weighting, such as: recommended alarm smoothing interval−(5*(asset impact rating−5). For instance, the asset impact rating 282 may be on a scale of 1 to 10, 0 to 9, or the like. For an asset impact rating of 5, there may be no change to the recommended alarm smoothing interval. For an asset impact rating of 7, the alarm smoothing interval may be shortened by 10 minutes from the recommended alarm smoothing interval. If the recommended alarm smoothing interval is 10 minutes or less, the alarm smoothing interval may be changed to the minimum allowable alarm smoothing interval (i.e., zero, or as close to immediate as practicable given the capabilities of the processing system). For an asset impact rating of 3, the alarm smoothing interval may be increased by 15 minutes, and so forth. It should be noted that this is just one example of modifying an alarm smoothing interval based on an asset impact rating, and that other, further, and different examples may be used in accordance with the present disclosure. For instance, in another example, a lower score may indicate a greater impact/greater importance of the network element. In another example, a larger or smaller scale/range may be used, the maximum and or minimum scores may be different, etc. In still another example, the modification may be a weighted percentage of the recommended alarm smoothing interval (e.g., instead of having a linear relationship between the time added or subtracted and the asset impact rating 220), and so forth.

At stage 230, the processing system may similarly obtain a technology complexing rating 284 of the network element, and may apply a second weighting to the recommended alarm smoothing interval based on the technology complexing rating 284. In one example, the technology complexing rating 284 may be assigned by a system operator, by a device owner (which in one example may be different from the system operator), or in another manner. In one example, the technology complexing rating 284 may be assigned to a category or class of devices to which the network element belongs. Accordingly, in one example, the processing system may obtain the device type of the network element (e.g., from asset features 280) and may perform a look-up the technology complexing rating 284. In one example, the second weighting may be determined via a rule or set of rules for technology complexity weighting, such as: recommended alarm smoothing interval−(5*(technology impact rating−5), or the like. For instance, the technology complexing rating 284 may be on a scale of 1 to 10, or the like. It should also be noted that in another example, the rule or rules may define a modification of the recommended alarm smoothing interval that is a weighted percentage of the recommended alarm smoothing interval (e.g., instead of having a linear relationship between the time added or subtracted and the support rating), and so forth. In one example, stage 230 may be preceded by an assessment of the complexity of an asset based on a rating scale. For instance, in one example, this may include an AI-based processed for discovering asset components and accumulating a score based on the components thereof. In any case, the impact score may be assigned and recorded in the asset attributes in inventory.

At stage 235, the processing system may determine a support rating for the affected network element. For instance, the support rating may indicate an availability of assistance to troubleshoot a root cause of the outage of the affected network element. In one example, stage 235 may consider the type of network element and the location of the network element and/or other geographic characteristics (e.g., on a cell tower, on the roof of a building, in a basement, etc.). In addition, stage 235 may consider the availability of personnel with expertise to troubleshoot a root cause and/or to resolve the outage remotely or in person at the physical location of the network element, the availability of one or more automated systems to troubleshoot the root cause (e.g., including scheduling/conflict management among other competing trouble tickets awaiting resolution, etc.), the availability of repair parts associated with the network element, customs or cross-border issues, or other factors. In this regard, as illustrated in FIG. 2, stage 235 is shown having inputs of asset features 280, personnel data 272, and inventory data 274. In one example, the support rating may be on a scale of 1 to 10, or the like. However, in other, further, and different examples, a different rating scale may be used.

At stage 240, the processing system may apply a third weighting to the recommended alarm smoothing interval based on the support rating determined at stage 235. For instance, in a similar manner to stages 220 and 230, stage 240 may also comprise the application of a rule or set of rules for support availability weighting, such as: recommended alarm smoothing interval−(5*(support rating−5), or the like. For instance, the support rating may be on a scale of 1 to 10, or the like. In another example the support rating may have a different range, and may be scaled to a range of 1 to 10 to utilize the foregoing formula. However, in another example, a different formula may be used. It should also be noted that in another example, the rule or rules may define a modification of the recommended alarm smoothing interval that is a weighted percentage of the recommended alarm smoothing interval (e.g., instead of having a linear relationship between the time added or subtracted and the support rating), and so forth.

At stage 245, the processing system may detect one or more relevant events that may be associated with the detected outage 201 (e.g., associated with the affected network element). For example, the processing system may obtain data from one or more event information sources 276, such as news websites, an RSS feed of breaking news, a weather data feed, etc. For instance, as described above ML-based theme/topic identification and sentiment analysis of selected news websites, feeds, or the like may identify scheduled events (e.g., major sporting events, presidential election, national holiday, etc.) or spontaneous events (e.g., breaking news, weather storm, cyber-attack, etc.). In one example, stage 245 may identify an event type, a location, and a magnitude (e.g., major flooding event, minor flooding event, major sporting event (e.g., championship game, popular opponent, etc.), minor sporting event (e.g., regular season game with 50% attendance forecast, etc.), major concert (e.g., sold out stadium), major holiday (e.g., most businesses closed, public services limited, etc.), minor holiday (e.g., observed by schools and governmental entities, but many businesses in normal operation, etc.) and so forth. It should be noted that the foregoing are provided by way of example only, and that in other, further, and different examples, different event categories and range/scale of magnitudes may be utilized. For instance, a MLM for event detection in a news feed may output a confidence score indicative of a likelihood of the event being a large, impactful event. The confidence score may be used as a metric of the magnitude of the event. Thus, for example, a sporting event that has many headlines and is widely discussed online may be more likely to be a major event than one that is only mentioned a few times and may thus result in a higher confidence score.

At stage 250, the processing system may apply a fourth weighting to the recommended alarm smoothing interval based on one or more detected events determined at stage 235. The fourth weighting may be determined in accordance with a rule or set of rules that account for the type of event and the location of the event in relation to a location of the affected network element. In one example, the rule or set of rules may also account for the event magnitude. To further illustrate, in the case of a weather event, the smoothing interval may be increased in proportion to a distance of the network element from a location of the weather event (e.g., a center of the weather event as may be determined via stage 245) according to a defined rule. In another example, the weather event may have a defined geographic bounds. As such, when the location of the network element is determined to be within the weather alert area, the smoothing interval may be increased by a defined duration of time and/or as a percentage of the smoothing interval. In one example, the rule(s) may be of a same or similar nature as described above in connection with stages 220, 230, and/or 240.

At stage 250, the processing system may output a final alarm smoothing interval 290. For instance, the processing system may delay issuance of an alarm/trouble ticket associated with the detected outage 201 in accordance with the final alarm smoothing interval 290. It should also be noted that insofar as stages 220, 230, and/or 240 may modify the recommended alarm smoothing interval, in one example the modifications of these stages may be applied sequentially. However, in another example, the modifications may be calculated in parallel with respect to the initial recommended alarm smoothing interval. Then, all modifications may be summed and applied thereafter. It should also be noted that the alarm smoothing interval may not be negative. As such, any modifications that may result in an alarm smoothing interval below zero may be reset to zero. Thus, these and other modifications are all contemplated within the scope of the present disclosure.

FIG. 3 illustrates a flowchart of an example method 300 for presenting an alarm indicative of an outage associated with at least one network element in accordance with an alarm smoothing interval based on a machine learning model output indicative of the alarm smoothing interval. In one example, steps, functions, and/or operations of the method 300 may be performed by a device as illustrated in FIG. 1, e.g., one or more of servers 135, network component(s) 155, nodes(s) 185, or the like. Alternatively, or in addition, the steps, functions and/or operations of the method 300 may be performed by a processing system collectively comprising a plurality of devices as illustrated in FIG. 1 such as one or more of servers 135, DB(s) 136, network component(s) 155, node(s) 185, elements of access network(s) 110 and/or 120, devices 111-113 and/or 121-123, and so forth. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth, in accordance with the present disclosure. For illustrative purposes, the method 300 is described in greater detail below in connection with an example performed by a processing system. The method 300 begins in step 305 and may proceed to optional step 310, optional step 320, or step 330.

At optional step 310, the processing system may maintain a sequence of records, e.g., comprising timing information of outages associated with a plurality of network elements. For instance, the sequence or records may comprise an outage log for the plurality of network elements. In one example, the processing system may periodically poll network elements, such as via Internet Control Message Protocol (ICMP) and/or Simple Network Management Protocol (SNMP) (e.g., at 1 minute intervals, 2 minute intervals, etc.) and may detect outages when responses are not received. In addition, the processing system may record these outages in the outage log. Alternatively, or in addition, the processing system may gather network element outage information from one or more other sources, such as traps, system log files, or notifications from other network elements, such as a peer-down messages, or the like. For example, the processing system may "subscribe" to a data feed comprising network element outage information (such as via Apache Kafka, or the like), and so forth. In one example, outage information from multiple sources may be combined into the outage log that may be maintained by the processing system. In one example, the sequence of records may be maintained for a sliding time window, e.g., a sequence form the last 24 hours, the last 12 hours, etc. In one example, the sequence may be associated with outages of network elements within a designated zone of responsibility, e.g., from a particular geographic area, one or more network zones (e.g., routing domains, or the like), for a particular entity (e.g., monitored network elements for a single organization, where an operator of the processing system may provide network management (e.g., including outage monitoring, troubleshooting, remediation, etc.) as a service to various other entities), and so forth.

At optional step 320, the processing system may train a machine learning model to predict/forecast alarm smoothing intervals for outages associated with respective network elements. In other words, the MLM may be trained to generate outputs indicative of alarm smoothing intervals for respective outage notifications associated with respective network elements. For instance, in one example, the outputs may be the alarm smoothing intervals. In another example, the outputs may be other values that may be mapped to respective alarm smoothing intervals according to a predefined criteria (e.g., a formula or one or more rules, etc.). As noted above, the MLM may be suitable for performing time-series predictive analysis, e.g., a multivariate time series forecasting model, such as a random forest MLM, a CNN, an AlexNet model, a WaveNet model, an LSTM model, an RNN, or the like. As also noted above, in one example, the MLM may be trained with a training data set comprising verified alarm smoothing intervals for outages associated with respective network elements of a plurality of network elements. In one example, the MLM may be trained with a loss function that applies to the verified alarm smoothing intervals and that excludes non-verified alarm smoothing intervals.

At step 330, the processing system detects an outage associated with at least one network element. For instance, the detection of the outage may be made in one of several ways, such as described above. For example, the outage may be detected by the processing system, via non-acknowledgement of ICMP, SNMP, or other polling/heartbeat message(s), via a notification from one or more other network elements, via a notification from the at least one network element itself (such as for an automated shutdown in response to one or more self-detected conditions). It should be noted that insofar as the outage may be associated with at least one network element, the outage may relate to a single network element, or a plurality of network elements collectively (e.g., a system). For instance, in one example, a network monitoring system may monitor a connection to a top of rack server, where a failure to respond to a polling message may indicate a potential failure with respect to all blades/servers in the rack, and so forth.

At step 340, the processing system applies at least one attribute of the at least one network element as at least a first input of a plurality of inputs to the MLM that is implemented by the processing system to obtain an output of the MLM indicative of an alarm smoothing interval. In one example, the plurality of input may comprise at least a second input, wherein the at least the second input comprises at least one of: at least one geographic feature of the at least one network element or at least one temporal indicator associated with a timing the outage. For instance, the at least one attribute may comprise network element type information (e.g., an asset class, a manufacturer, a version, etc.), one or more hardware features (e.g., a memory capacity, one or more processor specifications, one or more line card specifications, connected devices, ports used, available accessories, etc.), one or more software features (e.g., an operating system type, particular software in operation and or available on the network element, etc.), and so forth. In one example, the plurality of inputs may include at least a second input. Accordingly, step 304 may include applying the at least the second input as part of the plurality of inputs to the machine learning model (e.g., together with the at least the first input as a single input feature vector). The at least the second input may include at least one of: at least one geographic feature of the at least one network element or at least one temporal indicator associated with a timing the outage. For instance, the at least one temporal indicator (e.g., one or more time features) may comprise one or more indicators of: a time of year (e.g., a quarter, a month, etc.), whether the outage is on a holiday, whether the outage is a weekend or weekday, whether the outage is outside or inside business hours, or the like. Similarly, the at least one geographic feature may comprise one or more of: a state, county, or other geographic bounds in which the at least one network element is located, a developmental density of a physical location of the network element (e.g., whether a physical location of the at least one network element is urban, suburban, rural, etc.), an indicator of a site feature of the at least one network element (e.g., whether the physical location is at ground level, below ground, several stories above ground, whether the physical location is on a rooftop, a tower, or the like, etc.), and so forth.

Alternatively, or in addition, the at least the second input may include a sequence of records associated with outage alarms for a plurality of network elements (e.g., the sequence of records may comprise at least a portion of an outage log comprising an ordered list of outage records as described above). For instance, each record in the sequence of records may comprise a respective outage alarm time and an identification of a respective network element of the plurality of network elements. In one example, each record in the sequence of records may further comprise one or more of: at least one temporal indicator, at least one geographic attribute, or at least one attribute of the respective network element. In one example, the sequence of records may be from a defined period of time prior to the outage detected at step 330, may comprise a defined number of prior records (e.g., the last 500 records in the sequence of records prior to the outage detected at step 330, the last 1000 records, the last 2000 records etc.). In other words, the volume and/or frequency of prior outages may affect the duration of the alarm smoothing interval that is output via the MLM. It should again be noted that the result of step 340 may be the output of the MLM indicative of an alarm smoothing interval, e.g., a recommended/initial alarm smoothing interval.

At optional step 350, the processing system may adjust the alarm smoothing interval in accordance with at least one adjustment rule based on at least one of: an impact factor assigned to the at least one network element, a technological complexity factor assigned to the at least one network element, or a support availability factor associated with the at least one network element. For instance, optional step 350 may comprise one or more operations such as described in connection with stages 220-240 of the example process 200 of FIG. 2.

At optional step 360, the processing system may adjust the alarm smoothing interval in accordance with at least one adjustment rule based on at least one event factor. For example, the at least one event factor may be determined from analysis of at least one news feed, weather data feed, etc. and correlated to a location of the at least one network elements. For instance, optional step 360 may comprise one or more operations such as described in connection with stage 250 of the example process 200 of FIG. 2.

At step 370, the processing system presents an alarm indicative of the outage associated with the at least one network element in accordance with the alarm smoothing interval. In other words, the presenting of the alarm is delayed until after a passage of time comprising the alarm smoothing interval. The alarm may be presented to one or more network personnel responsible for trouble ticket processing and resolution, one or more network technicians, or the like. Alternatively, or in addition, the alarm may be presented to an owner or other entity associated with the one or more affected network elements (e.g., where the entity may be different from the operator of the processing system). In one example, the alarm may be presented to one or more automated systems, e.g., one or more automated troubleshooting systems, or the like.

At optional step 380, the processing system may perform at least one remedial action in response to the alarm. For instance, the at least one remedial action may comprise applying one or more automated troubleshooting tools (e.g., a remote diagnostic tool) to attempt to identify a root cause, initiating a remote reset command to the at least one network element, and so forth. Alternatively, or in addition, the at least one remedial action may include scheduling a technician for a site visit to troubleshoot the at least one network element in person, and so forth. In a SDN environment, the at least one remedial action may include reconfiguring at least one aspect of a communication network, such as rerouting traffic, adding new VNF(s) (e.g., to replace and/or replicate one or more malfunctioning VNF(s), load balancing between servers, beam steering, such as to provide cellular network coverage from another cell site to an area previously served by a down sector or cell, and so forth. For instance, an outage may be detected for an overloaded serving gateway (SGW), and the remedial action may be to instantiate a new virtual SGW (vSGW) and redirecting traffic from one or more cell sites to the new vSGW. In another example, an outage may be indicative of a denial of service (DOS) attack on a server and the remedial action may be to slow the transmission of traffic to the server from other network elements that are one or two hops from the server under attack (and which may forward traffic to/toward the server under attack).

At optional step 390, the processing system may obtain and store a label associated with the alarm, e.g., an indicator of whether the alarm smoothing interval was correct, or of a preferred duration of time. For instance, network personnel responsible for processing alarms/trouble tickets may provide feedback that the alarm smoothing interval that was used was too short, too long, or just right/correct. Alternatively, or in addition, in one example, for an alarm in which no feedback is received, it may be assumed that the alarm smoothing interval was correct, and the alarm may be labeled as a verified alarm smoothing interval. In one example, the storing may be in the outage log and/or sequence of records described above (e.g., at optional step 310, etc.).

Following step 370, or one of optional steps 380 or 390, the method 300 ends in step 395. It should be noted that method 300 may be expanded to include additional steps, or may be modified to replace steps with different steps, to combine steps, to omit steps, to perform steps in a different order, and so forth. For instance, in one example, the processing system may repeat one or more steps of the method 300, such as steps 330-370 for additional outages, steps 310-320 for retraining the MLM in accordance with new verified alarm smoothing intervals, and so forth. In one example, the method 300 may further include steps associated with operations described in connection with stages 235 and/or 245 of FIG. 2. In one example, the loss function for MLM training may be to minimize a forecast/prediction inaccuracy of the alarm smoothing interval after post-MLM adjustment (e.g., after the adjustment(s) of optional step 350 and/or optional step 360). For instance, since the adjustment rule(s) may be fixed/formulaic, the MLM loss function may adapt the MLM (e.g., neuron weights, etc.) to account for the application of these adjustments. In one example, the MLM may be associated with a zone of responsibility". For instance, the number and/or frequency of other alarms in the sequence of records may be specific/localized to the zone of responsibility. In one example, one MLM may be trained and then copies of the MLM may be deployed for use in connection with respective zones. In another example, different MLMs may be trained with different training data that is specific to respective zones (e.g., but with same hyper-parameters, such as number of neurons in hidden layer(s), etc.).

In still another example, the at least one attribute of the network element may include features described in connection with step 350 (and/or stages 220-230 of FIG. 2). For example, an impact factor of the at least one network element (such as an asset priority of the network element (e.g., low, normal, high, critical, or unknown, or the like), an impact score of the network element (e.g., minimal, minor, medium, major, critical, or unknown, or the like), a service level class of the network element (e.g., according to an SLA or the like)), a technological complexity of the network element, or the like may be factors associated with MLM training examples as well as an input vector associated with the outage detected at step 330. In other words, these factors may be taken into account via the MLM in selecting the alarm smoothing interval, e.g., as an alternative to affecting the recommended alarm smoothing interval as post-processing steps after the MLM output. In one example, the method 300 may include receiving and implementing an override of any alarm smoothing intervals. For example, a security breach may be detected and a responsible network personnel may then issue a command to stop all alarms (e.g., for a particular network zone, for a particular class of network elements, etc.) because there was a cyber-attack identified. Similarly, in one example, the method 300 may further include adjusting the smoothing interval for network elements (or network element types) with repetitive outages/alarms. For instance, repetitive conditions, such as congestion, high error rates, power issues, mobile users with evolving app memory leak resulting in a slowly degrading service, etc. may be tagged for increased alarm smoothing intervals. Alternatively, or in addition, such factors may be included in the calculation of an impact factor/impact rating at step 350. Thus, these and other modifications are all contemplated within the scope of the present disclosure.

In addition, although not specifically specified, one or more steps, functions, or operations of the method 300 may include a storing, displaying, and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

Figure 4:
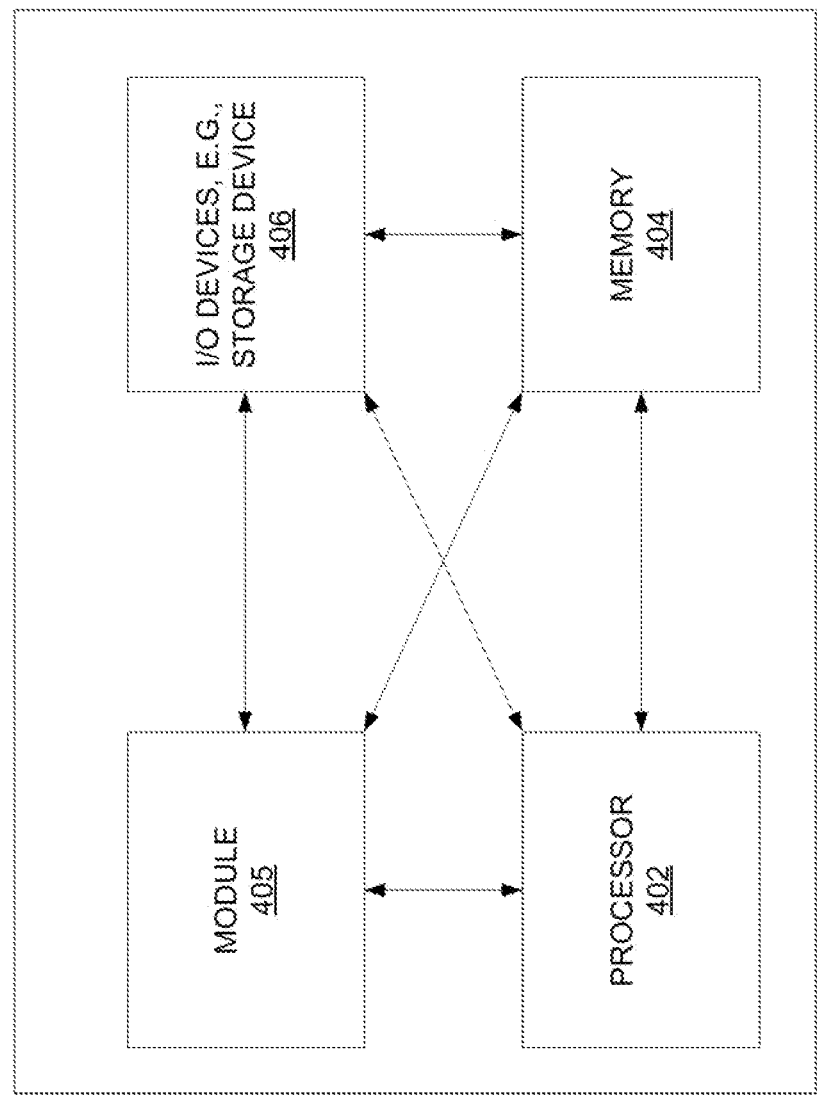
FIG. 4 illustrates a high-level block diagram of a computing device specially programmed to perform the functions described herein.

FIG. 4 depicts a high-level block diagram of a computing device or processing system specifically programmed to perform the functions described herein. For example, any one or more components or devices illustrated in FIG. 1, or described in connection with the examples of FIGS. 2 and 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for presenting an alarm indicative of an outage associated with at least one network element in accordance with an alarm smoothing interval based on a machine learning model output indicative of the alarm smoothing interval, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for presenting an alarm indicative of an outage associated with at least one network element in accordance with an alarm smoothing interval based on a machine learning model output indicative of the alarm smoothing interval (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for presenting an alarm indicative of an outage associated with at least one network element in accordance with an alarm smoothing interval based on a machine learning model output indicative of the alarm smoothing interval (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   training a machine learning model, wherein the machine learning model is trained with a training data set comprising verified alarm smoothing intervals for outages associated with respective network elements of a plurality of network elements, and wherein the machine learning model is trained with a loss function that applies to the verified alarm smoothing intervals and that excludes non-verified alarm smoothing intervals;
   detecting, by a processing system including at least one processor, an outage associated with at least one network element;
   applying, by the processing system, at least one attribute of the at least one network element as at least a first input of a plurality of inputs to the machine learning model that is implemented by the processing system to obtain an output of the machine learning model indicative of an alarm smoothing interval; and
   presenting, by the processing system in accordance with the alarm smoothing interval, an alarm indicative of the outage associated with the at least one network element.

2. The method of claim 1, wherein the presenting is delayed until after a passage of time comprising the alarm smoothing interval.

3. The method of claim 1, wherein the plurality of inputs comprises at least a second input, wherein the at least the second input comprises at least one of:
   at least one geographic feature of the at least one network element; or
   at least one temporal indicator associated with a timing of the outage.

4. The method of claim 3, wherein the at least one temporal indicator comprise an indicator of at least one of:
   a time of year of the outage;
   whether the outage is on one of a weekday or a weekend;
   whether the outage is on a holiday; or
   whether the outage is outside or business hours.

5. The method of claim 3, wherein the at least one geographic feature comprises at least one of:
   a geographic bound in which the at least one network element is located;

a development density of a physical location of the at least one network element; or
an indicator of at least one site feature of the physical location of the at least one network element.

6. The method of claim 1, wherein the at least one attribute comprises at least one of:
network element type information;
one or more hardware features; or
one or more software features.

7. The method of claim 1, wherein the plurality of inputs comprises at least a second input, wherein the at least the second input comprises a sequence of records, the sequence of records associated with outage alarms for a second plurality of network elements.

8. The method of claim 7, wherein each record in the sequence of records comprises a respective outage alarm time and an identification of a respective network element of the second plurality of network elements.

9. The method of claim 8, wherein each record in the sequence of records further comprises one or more of: at least one temporal indicator, at least one geographic attribute, or at least one attribute of the respective network element.

10. The method of claim 7, wherein the machine learning model comprises a time series prediction model.

11. The method of claim 7, further comprising:
maintaining the sequence of records.

12. The method of claim 1, wherein the machine learning model comprises:
a random forest model;
a convolutional neural network;
an AlexNet model; or
a WaveNet model.

13. The method of claim 1, wherein the machine learning model comprises a multivariate time series forecasting model.

14. The method of claim 1, further comprising:
adjusting the alarm smoothing interval in accordance with at least one adjustment rule based on at least one of:
an impact factor assigned to the at least one network element;
a technological complexity factor assigned to the at least one network element; or
a support availability factor associated with the at least one network element.

15. The method of claim 1, further comprising:
adjusting the alarm smoothing interval in accordance with at least one adjustment rule based on at least one event factor.

16. A non-transitory computer-readable medium storing instructions which, when executed by a processing system including at least one processor, cause the processing system to perform operations, the operations comprising:
training a machine learning model, wherein the machine learning model is trained with a training data set comprising verified alarm smoothing intervals for outages associated with respective network elements of a plurality of network elements, and wherein the machine learning model is trained with a loss function that applies to the verified alarm smoothing intervals and that excludes non-verified alarm smoothing intervals;
detecting an outage associated with at least one network element;
applying at least one attribute of the at least one network element as at least a first input of a plurality of inputs to the machine learning model that is implemented by the processing system to obtain an output of the machine learning model indicative of an alarm smoothing interval; and
presenting, in accordance with the alarm smoothing interval, an alarm indicative of the outage associated with the at least one network element.

17. An apparatus comprising:
a processing system including at least one processor; and
a computer-readable medium storing instructions which, when executed by the processing system, cause the processing system to perform operations, the operations comprising:
training a machine learning model, wherein the machine learning model is trained with a training data set comprising verified alarm smoothing intervals for outages associated with respective network elements of a plurality of network elements, and wherein the machine learning model is trained with a loss function that applies to the verified alarm smoothing intervals and that excludes non-verified alarm smoothing intervals;
detecting an outage associated with at least one network element;
applying at least one attribute of the at least one network element as at least a first input of a plurality of inputs to the machine learning model that is implemented by the processing system to obtain an output of the machine learning model indicative of an alarm smoothing interval; and
presenting, in accordance with the alarm smoothing interval, an alarm indicative of the outage associated with the at least one network element.

18. The apparatus of claim 17, wherein the presenting is delayed until after a passage of time comprising the alarm smoothing interval.

19. The apparatus of claim 17, wherein the plurality of inputs comprises at least a second input, wherein the at least the second input comprises at least one of:
at least one geographic feature of the at least one network element; or
at least one temporal indicator associated with a timing of the outage.

20. The apparatus of claim 19, wherein the at least one temporal indicator comprise an indicator of at least one of:
a time of year of the outage;
whether the outage is on one of a weekday or a weekend;
whether the outage is on a holiday; or
whether the outage is outside or business hours.

* * * * *